Aug. 27, 1968　　　　　　　E. R. JONSON　　　　　　　3,398,658
METHOD OF SEALING CARTONS, AND CARTONS THUS SEALED
Filed Nov. 30, 1965
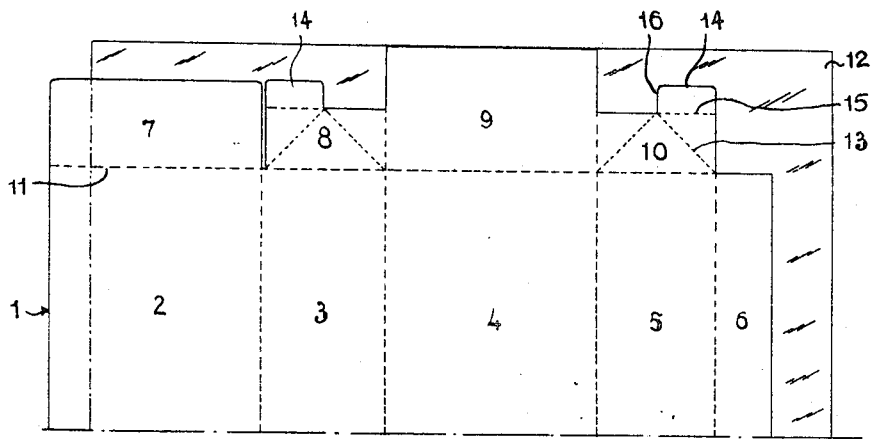
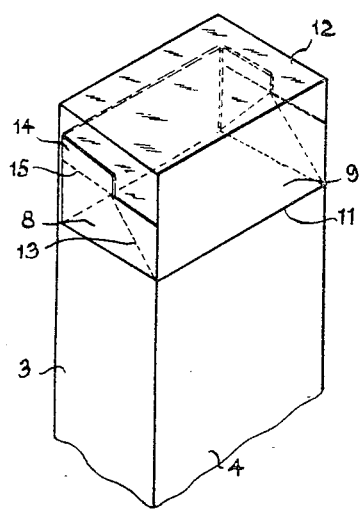
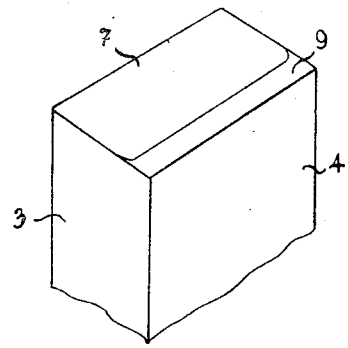
Inventor
Erik Rune Jonson
By
Karl W. Flocks
Attorney United States Patent Office 3,398,658
Patented Aug. 27, 1968

3,398,658
METHOD OF SEALING CARTONS, AND
CARTONS THUS SEALED
Erik Rune Jonson, Norrkoping, Sweden, assignor to
Esseltepac Aktiebolag, Norrkoping, Sweden
Filed Nov. 30, 1965, Ser. No. 520,296
Claims priority, application Sweden, Dec. 2, 1964,
14,529/64
5 Claims. (Cl. 93—36.01)

ABSTRACT OF THE DISCLOSURE

The method according to the invention is substantially characterized by the steps of sealing the lining at its mouth, with lining material in application with lining material, by means of a pair of press jaws or like members one of which jaws engages the lining while the other jaw engages one of the flaps serving as end closure members, against which flap the lining is in application. The carton sealed in accordance with the method.

---

This invention relates to a method of sealing a carton of the type which comprises on one hand an outer rectangular sleeve of cardboard or like material having flaps serving as end closure members, and on the other hand a lining unslit at the corners and projecting such a distance beyond the sleeve as to permit the lining to be sealed at the ends. The method according to the invention is substantially characterised by the steps of sealing the lining at its mouth, with lining material in application with lining material, by means of a pair of press jaws or like members one of which jaws engages the lining while the other jaw engages one of the flaps serving as end closure members, against which flap the lining is in application. By allowing one press jaw to engage with a cardboard element the advantage is gained that the cardboard element which is resilient takes up an irregularly distributed pressure.

According to an important feature of the invention the lining prior to the sealing is to be glued or connected in any other suitable manner to that of the flaps serving as end closure members against which flap the lining bears during sealing. By this feature the lining material at the mouth will be kept smooth at the sealing, which makes for a tight seal.

In connection with the sealing the lining is preferably to be folded in such a way that the mouth portion thereof lies entirely inside the flap against which the lining bears during sealing. One pair of opposed lining sides shall be plane at the mouth portion while the other pair of opposed lining sides should be doubled inside the plane lining sides. The pressure equalization produced by the cardboard element thus is to the benefit of the entire mouth of the lining.

The seal can be produced either by application of heat and pressure or solely pressure depending upon the nature of the coating utilized for this purpose on the inner side of the lining. With the use of heat sealing it is necessary as a rule solely to heat the press jaw engaging the lining, which is due to the heat insulation provided by the cardboard flap. This also entails the advantage that it is necessary to provide only part of the sealing assembly with protective means to avoid dirtying through particles of the heat-sensitive lining material.

By reason of the lining material being protected by cardboard on one side of the distortion of the lining material is reduced to a minimum when the sealing thereof is effected during motion of said material.

The invention also relates to the cartons sealed by means of the method outlined above. For this reason a carton specially suited for sealing by the method according to the invention will be described in connection with the accompanying drawing.

In the drawing:

FIG. 1 is a developed plan view of part of the carton blank;

FIG. 2 is a perspective view of said part of the blank erected into a carton but not as yet sealed;

FIG. 3 is a perspective view of the erected carton in the sealed state.

The carton blank 1 of cardboard or like material is divided by longitudinal crease lines into five panels 2–6. The panels 2–5 which in pairs are of equal size are to constitute the carton sides, while the panel 6 is a glue panel which at the erection of the carton is to be glued to the panel 2.

Hinged to the panels 2–5 are end flaps 7–10 which are to form the end closure members of the carton. Said end flaps 7–10 are preferably provided at both ends of the panels 2–5. The end flaps 7–10 are delimited from the panels 2–5 by crease lines 11.

The blank 1 is provided with a lining 12 which is suited for sealing by application of heat and pressure or solely pressure and which wholly covers the inner side of the carton. However, the lining 12 could also be provided at the ends only of the panels 2–5. The lining 12 which is unslit at the corners projects such a distance beyond the panels 2–5 forming the carton sides that it is closable at the carton ends by bellows folding. To realize said bellows folding the lining 12 is glued to the three integral end flaps 8, 9 and 10. The fourth flap 7 which is separated from the other flaps 8–10 and the lining 12 is adapted in the sealed state of the carton to form the cover and the bottom, respectively, of the carton.

The intermediary end flap 9 of the three integral end flaps 8–10 is of a length which at least fundamentally is equal to the width of those two opposed sides 3 and 5 of the carton between which the flap 9 is located. Besides the lining 12 projects equally far beyond the carton as the intermediary flap 9, while the two outer flaps 8 and 10 of the three integral end flaps 8–10 are of a length smaller than that of the intermediary flap 9. By this arrangement the lining 12 can be sealed at its mouth, with lining material in application with lining material by means of a pair of press jaws or like members, one of which jaws engages the lining 12 while the other jaw engages one flap 9 of the flaps 7–10 serving as end closure members, against which flap 9 the lining 12 is in application.

In an embodiment the two outer flaps 8 and 10 are substantially half as long as the intermediary flap 9 and provided with crease lines 13 which extend from the inner corners and preferably are punched through at points, said crease lines converging at the middle of the outer edges of the flaps 8 and 10. The crease lines 13 make an angle of approximately 45° with the crease line 11; the deflection, if any, from 45° is dependent upon the cardboard thickness.

In the preferred embodiment illustrated the two outer flaps 8 and 10 at the outer edges are provided with narrow tongues 14 projecting from the middle of one edge of the flaps 8 and 10 and delimited from the flaps 8 and 10 by a crease line 15 preferably punched through at points and diverging slightly from the crease line 11 by reason of the cardboard thickness. The tongues 14 of which the edges 16 extend along the axis of the sides 3 and 5, effectively contribute to the bellows folding of the lining 12.

The narrow tongues 14 preferably extend to the edges of the two outer flaps 8 and 10 facing the flap 7 which projects equally far beyond the carton sides as the tongues 14. The flap 7 preferably is of a length which is three quarters of that of the intermediary flap 9.

The above embodiment of the invention was described for purposes of illustration rather than limitation. Variations and modifications of the invention are possible within the scope of the appended claims.

What I claim and desire to secure by Letters Patent is:

1. A method of sealing a carton of the type which comprises on one hand an outer rectangular sleeve of cardboard or like material having flaps serving as end closure members, and on the other hand a lining unslit at the corners and projecting such a distance beyond the sleeve as to permit the lining to be sealed at one end, comprising the steps of sealing the lining at its mouth, with lining material in application with lining material, by pressing in a pair of locations with one pressure location at the lining and the other pressure location at one of the flaps serving as end closure members, against which flap the lining is in application.

2. A method in accordance with claim 1, wherein the lining prior to the sealing is glued to that of the flaps serving as end closure members, against which the lining is in application during the sealing operation.

3. A method in accordance with claim 1, wherein the lining is folded in connection with the sealing in such a way that the mouth portion lies entirely inside the flap against which the lining is in application during the sealing operation, one pair of opposed lining sides being plane while the other pair of such sides are doubled inside the plane lining sides.

4. A method in accordance with claim 1, wherein the sealing is performed by application of heat and pressure, and preferably only the press jaw engaging the lining is heated.

5. Cartons sealed by the method according to claim 1.

References Cited

UNITED STATES PATENTS

| 2,758,520 | 8/1956 | Hepworth | 93—36.01 |
| 3,071,304 | 1/1963 | Brastad | 229—14 |

BERNARD STICKNEY, *Primary Examiner.*